United States Patent [19]

Suh

[11] Patent Number: 5,720,180

[45] Date of Patent: Feb. 24, 1998

[54] OPERATING CONTROL CIRCUIT FOR A REFRIGERATOR HAVING HIGH EFFICIENCY MULTI-EVAPORATOR CYCLE (H.M. CYCLE)

[75] Inventor: Kook Jung Suh, Seoul, Rep. of Korea

[73] Assignee: Samsung Electronics Co., Ltd., Suwon, Rep. of Korea

[21] Appl. No.: 552,480

[22] Filed: Nov. 9, 1995

[30] Foreign Application Priority Data

| Nov. 11, 1994 | [KR] | Rep. of Korea | 94-29469 |
| Nov. 11, 1994 | [KR] | Rep. of Korea | 94-29473 |
| May 30, 1995 | [KR] | Rep. of Korea | 95-13928 |

[51] Int. Cl.$^6$ ............................................. F25D 17/06
[52] U.S. Cl. ............................ 62/179; 62/180; 62/203
[58] Field of Search .................... 62/179, 180, 186, 62/203, 182, 441, 442, 199, 200

[56] References Cited

U.S. PATENT DOCUMENTS

| 3,218,819 | 11/1965 | Crotser | 62/442 X |
| 4,439,998 | 4/1984 | Horvay et al. | 62/199 |
| 5,216,247 | 6/1993 | Knezic et al. | 62/199 X |
| 5,272,884 | 12/1993 | Cur et al. | 62/199 |

*Primary Examiner*—Harry B. Tanner
*Attorney, Agent, or Firm*—Burns, Doane, Swecker & Mathis, L.L.P.

[57] ABSTRACT

A refrigerator includes a compressor, and freezing and refrigerating compartments, each compartment having its own evaporator and fan. Only one of those fans can be operated at any given time. To operate the refrigerator, an actual temperature of a first of the compartments (either the freezing compartment or the refrigerating compartment) is compared with a reference temperature. If the actual temperature is lower than the reference temperature, then neither of the fans is operated. If the actual temperature is greater than the reference temperature, then an actual temperature of the second compartment is compared with a reference temperature. If the actual temperature of the second compartment is higher than its respective reference temperature, then the fan of only the second compartment is operated; otherwise, the fan of only the first compartment is operated.

6 Claims, 6 Drawing Sheets

OPERATING CONTROL CIRCUIT FOR A REFRIGERATOR HAVING HIGH EFFICIENCY MULTI-EVAPORATOR CYCLE (H.M. CYCLE)

RELATED INVENTIONS

This invention is related to inventions disclosed in concurrently filed application Ser. Nos. 08/556,143 and 08/555,811 of the present inventor (Attorney Docket Nos. 024012-170 and 024012-172, respectively).

BACKGROUND OF THE INVENTION

This invention relates to a operating control circuit for a refrigerator, and more particularly to an operating control circuit for a refrigerator having an evaporator and a blow fan in each of a refrigerating compartment and a freezing compartment and a control method thereof.

PRIOR ART

Generally, a refrigerator has two compartments, i.e., freezing and refrigerating compartments which are cooled to different temperatures from each other. In order to cool the compartments, the refrigerator has a number of components for performing a refrigerating cycle. Among these components, an evaporator is disposed in one of the compartments so as to cool the compartments by exchanging heat with the inner air of the compartments, and a blow fan is disposed near the evaporator so as to blow the cool air generated by the heat-exchanging operation into the compartments.

Figure 1A:
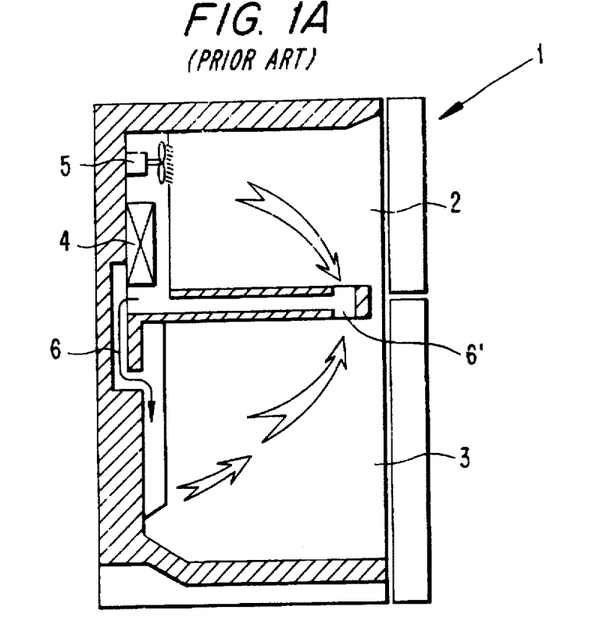
FIG. 1A is a schematic vertical cross-sectional view illustrating a conventional refrigerator.

FIG. 1A shows the simple configuration of a prior art refrigerator 1, including a freezing compartment 2 and a refrigerating compartment 3 separated from each other. An evaporator 4 is disposed at the rear wall of the freezing compartment 2, and a blow fan 5 is positioned above the evaporator 4. Additionally, the refrigerator 1 includes an air flow passage 6 for guiding the cool air generated at the evaporator 4 into the compartments and an air flow passage 6' for guiding the inner air of the compartments to the evaporator 4.

Figure 1B:
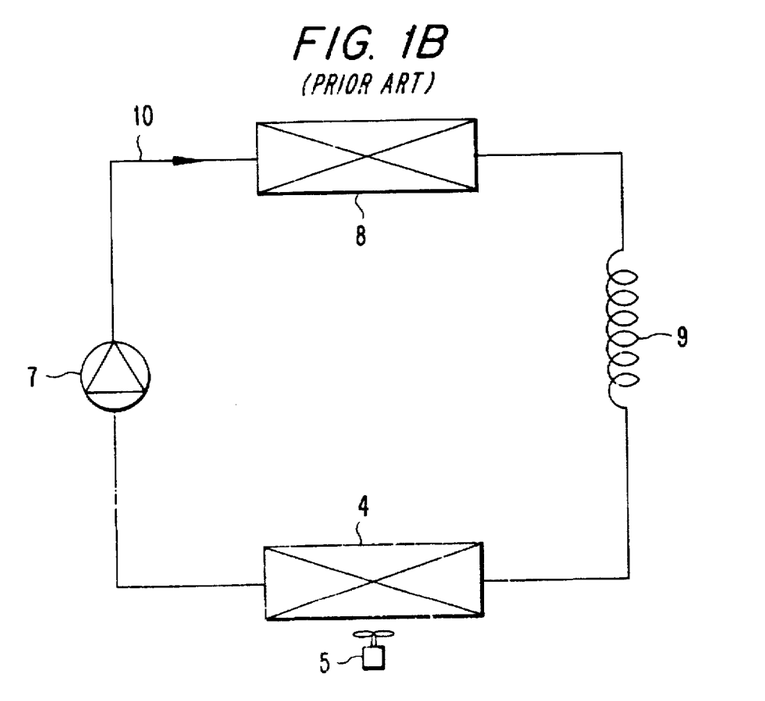
FIG. 1B is a view illustrating a refrigerating cycle adapted to a conventional refrigerator.

This refrigerating cycle configuration of the refrigerator 1 is shown in FIG. 1B. Namely, it is a closed loop comprising a compressor 7 in which a refrigerant is compressed into a higher temperature and higher pressure state, a condenser 8 in which the compressed refrigerant is condensed by exchanging heat with ambient air, a capillary tube 9 in which the condensed refrigerant is expanded, and the above-mentioned evaporator 4, wherein the members are connected to one another by a refrigerant tube. The operation fluid of the refrigerating cycle, i.e., the refrigerant, is compressed in the compressor 7, condensed in the condenser 8, expanded in the capillary tube 9, and then evaporated in the evaporator 4. While evaporated in the evaporator 4, the refrigerant absorbs heat from the inner air of the refrigerator 1 passing the evaporator 4 under the operation of the blow fan 5.

However, because this prior art refrigerator includes one evaporator and one blow fan, it is difficult to control two spaces at different temperatures from each other. Namely, a freezing compartment should be maintained at one desirable temperature, -21° C. -15° C., i.e., -21° C. to -15° C., to keep food frozen, and a refrigerating compartment should be maintained at an other desirable temperature, i.e., -1° C. to 6° C., to keep food cold. Therefore, the prior art refrigerator has a complicated control system so that one evaporator refrigerates both of the compartments at its respective desirable temperature. That is, its structure is complex, and it is difficult to control each temperature. Additionally, because only one evaporator is used and has a limited refrigerating capacity, there are problems that a freezing and a refrigerating compartment cannot be rapidly refrigerated, and each temperature change of the compartments cannot be quickly accommodated (e.g., in response to load change, or temperature change of ambient air). In view of these problems, it would be desirable to minimize the variations in the set temperature occurring in each one of the compartments. Moreover, it would be desirable to simplify the inner structure of a refrigerator.

SUMMARY OF THE INVENTION

An object of the present invention is to provide a operating control circuit for a refrigerator and a control method thereof which are capable of individually controlling the temperatures of the freezing and refrigerating compartments.

Another object of the present invention is to provide an operating control circuit for a refrigerator and a control method thereof which arrange an evaporator and a fan in each of the freezing and refrigerating compartments, and selectively operate only one of the fans, for reducing the electric power consumption caused by an excessive operation.

Another object of the present invention is to provide an operating control circuit for a refrigerator and a control method thereof which separately controls the temperatures of a freezing compartment and refrigerating compartment, and for simplifying the structure of a middle partition.

Another object of the present invention is to provide an operating control circuit for a refrigerator and a control method thereof which drive a compressor in accordance with a freezing or a refrigerating compartment's temperature, and selectively operate any one of the fans of the compartments in accordance with a freezing or a refrigerating compartment's temperature under the operation of the compressor, for achieving efficient operation and decreasing energy consumption.

According to the present invention, an operating control circuit for a refrigerator comprises freezing and refrigerating compartments being partitioned from each other and cooled at different temperatures from each other;

first and second evaporators being disposed in respective ones of the compartments;

a freezing temperature sensor for detecting the temperature of the freezing compartment;

a refrigerating temperature sensor for detecting the temperature of the refrigerating compartment;

first and second blow fans mounted in the freezing and refrigerating compartments, respectively, which are connected in parallel to an A.C. power source;

a compressor connected to the A.C. power source;

first switch for turning on and off the compressor and the first and second blow fans;

second switch for selectively turning on any one of the first and second blow fans when the compressor is turned on by the first switch;

a control portion for controlling the first and second switches according to the temperatures detected by the temperature sensors. Accordingly, selective cooling of any one of the freezing and refrigerating compartments is possible.

Also, a control method according to the present invention is provided for a refrigerator having first and second temperature sensing means disposed at each of the first and second compartments cooled at different temperatures from each other, first and second blow fans mounted in the first and second compartments, first switching means for turning on a compressor and for turning off a compressor and the blow fans, second switching means for selectively turning on any one of the first and second blow fans when the compressor is turned on by the first switching means, a control portion for controlling the first and second switching means, the method comprises

- a step for reading the temperature data of the first and second compartments per every predetermined time from the temperature sensors;
- a step for comparing the detected temperature of the first compartment with the first set temperature determined by a user;
- a step for controlling the first switching means so as to turn off the compressor and the blow fans when the temperature of the first compartment is lower than the first set temperature in the comparison step;
- a step for comparing the detected temperature of the second compartment with the second set temperature determined by a user when the temperature of the first compartment is higher than the first set temperature in the comparison step;
- a step for controlling the first and second switching means so as to turn on the compressor and the second blow fan when the temperature of the second compartment is higher than the second set temperature in the comparison step of the temperature of the second compartment;
- a step for controlling the first and second switching means so as to turn on the compressor and the first blow fan when the temperature of the second compartment is lower than the second set temperature in the comparison step of the temperature of the second compartment. The control method is accomplished by the control portion.

BRIEF DESCRIPTION OF THE DRAWINGS

The invention now will be explained in detail with reference to the accompanying drawings, in which.

DESCRIPTION OF THE PREFERRED EMBODIMENTS

Figure 2A:
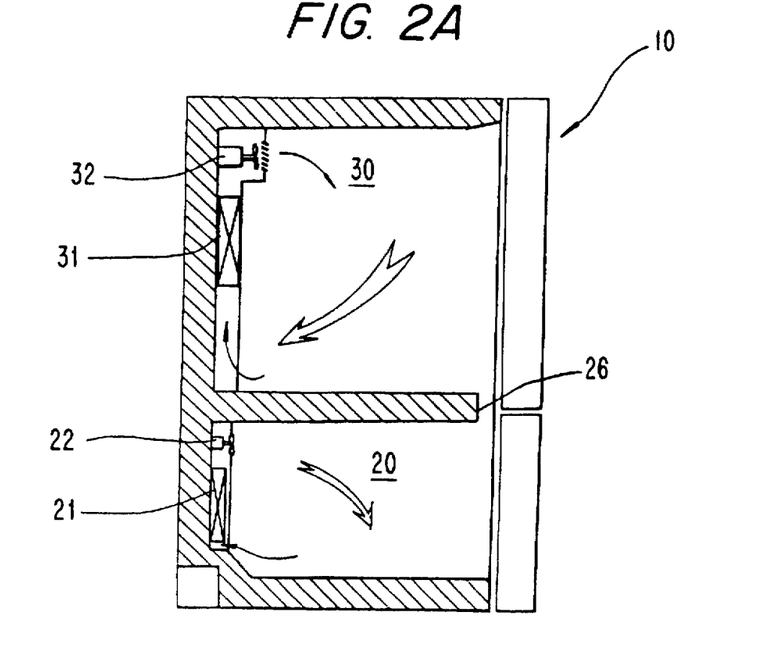
FIG. 2A is a schematic vertical cross-sectional view illustrating a refrigerator according to the invention.
Figure 2B:
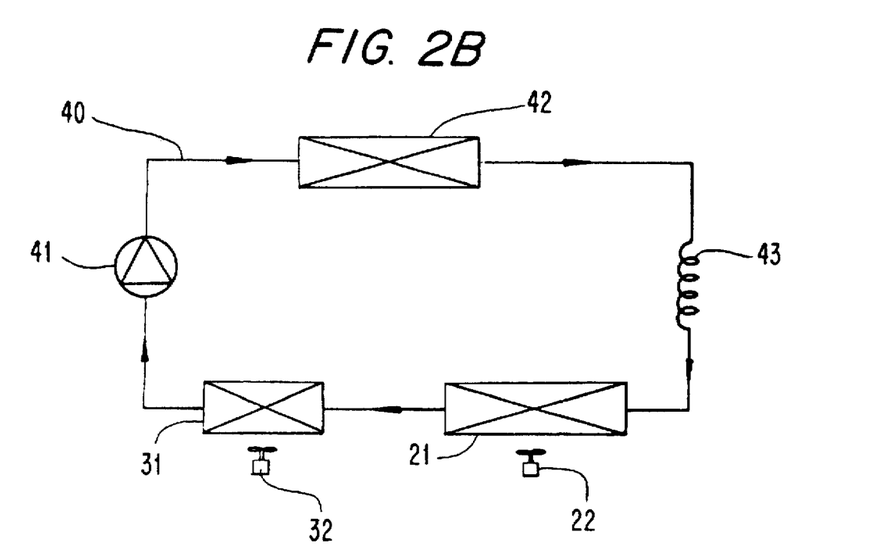
FIG. 2B is a view illustrating a refrigerating cycle adapted to the refrigerator according to the invention.

Referring to FIG. 2A, a refrigerator 10 comprises a freezing compartment 20 and a refrigerating compartment 30 which are divided from each other. An evaporator 21 is mounted in the rear wall of the freezing compartment 20, and an evaporator 31 is provided in the rear wall of the refrigerating compartment 30. The evaporators 21 and 31 are coupled in series to each other by means of a refrigerant tube 40, which is included in the refrigerating cycle of FIG. 2B. The refrigerating cycle includes a compressor 41, a condenser 42, the evaporators 21 and 31 and a capillary tube 43 connected by means of a refrigerant tube 40 to form a closed loop. Because the evaporators 21 and 31 are connected to each other in series, the refrigerant outputted from the evaporator 21 flows into the evaporator 31. Thus, the refrigerant is compressed at the compressor 41, condensed at the condenser 42 and then expanded at the capillary tube 43. The expanded refrigerant is partially evaporated while passing through the evaporator 21 and the non-evaporated refrigerant is evaporated while passing through the evaporator 31, thereby the heat exchanging function is accomplished in each of the compartments. The refrigerant flows into the compressor 41 in a gas state, therefore the refrigerating cycle is completed. The refrigerating cycle is repeated during the operation of the compressor 41. Herein, it is noted that the evaporators 21 and 31 have their own inherent size and capacity designed to be matched with the volumes and control temperatures of respective compartments.

On the other hand, a blow fan 22 (freezing fan) is mounted adjacent to the evaporator 21 of the freezing compartment 20, and a blow fan 32 (refrigerating fan) is mounted adjacent to the evaporator 31 of the refrigerating compartment 30. The blow fans 22 and 32 are operated according to the operation of the compressor 41 so as to heat-exchange each of the evaporators 21 and 31 with respective air flows circulated in the freezing and refrigerating compartments 21 and 31. At that time, the temperature of each compartment is controlled at a predetermined temperature. The blow fans 22 and 32 are connected in parallel to each other by an A.C. power source.

Therefore, the invention does not require any additional structure, except for a middle partition 26, as a result of the separation of the freezing and refrigerating compartments 20 and 30 from one another. In other words, a cooling air flow passage is not required in the middle portion 26, and no duct and damper are required in the cooling air flow passage formed in the rear wall of the refrigerator. It means the configuration of a refrigerator is simplified.

Figure 3:
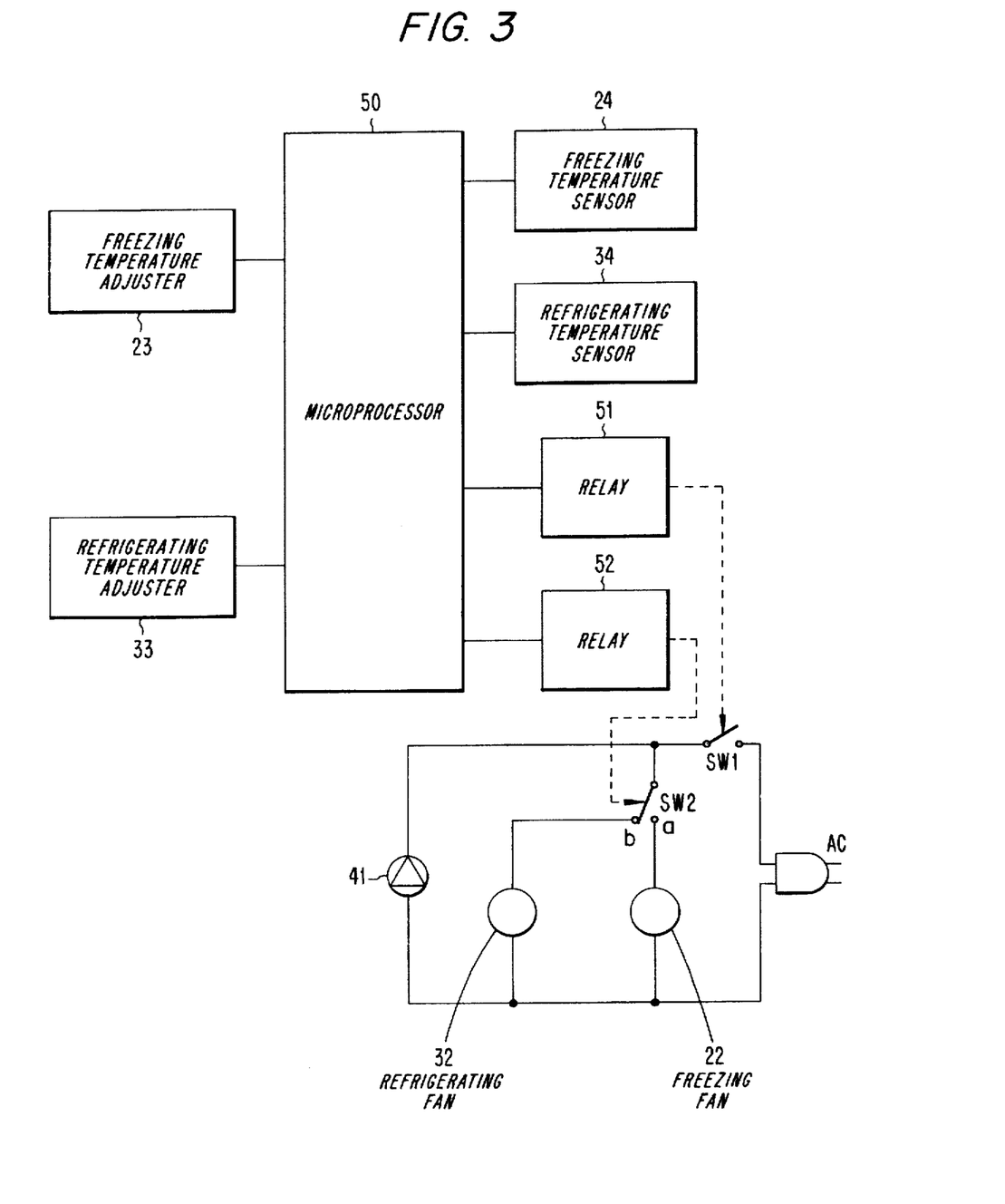
FIG. 3 is an operating control circuit illustrating one embodiment of the invention.

An operating control circuit for controlling the operation of a refrigerator according to one embodiment of the invention is shown in FIG. 3. The operating control circuit comprises a microprocessor 50, including a freezing temperature adjuster 23 for setting the temperature of the freezing compartment 20, a refrigerating temperature adjuster 33 for setting the temperature of the refrigerating compartment 30, a freezing temperature sensor 24 for detecting the temperature of the freezing compartment 20, a refrigerating temperature sensor 34 for detecting the temperature of the refrigerating compartment 30 connected to its inputting portion, and first and second relays 51 and 52 connected to an outputting portion of the microprocessor. The freezing temperature adjuster 23 is provided on a control panel(not shown) of the refrigerator for setting the temperature of the freezing compartment 20 at the temperature appropriate for the freezing storage of foods. The setting range of the freezing storage temperature is −15 C. to −21 C. Generally, a user sets the temperatures of the freezing compartment 20 within this range. Actually, the set temperature of the freezing compartment 20 is selected to be any one of (strong freezing), −18° C. (middle freezing) and 15°

C. (weak freezing). The refrigerating temperature adjuster 33 is provided on the control panel (not shown) of the refrigerator for setting the temperature of the refrigerating compartment 30 at the temperature appropriate for the refrigerating storage of foods. The setting range of the refrigerating storage temperature is −1° C. to 6° C. Generally, a user sets the temperatures of the refrigerating compartment 30 within this range. Actually, the set temperature of the refrigerating compartment 30 is selected to be any one of −1° C. (the strong refrigerating), 3° C. (the middle refrigerating) and 6° C. (the weak refrigerating). First switch SW1 is connected at one end to an A.C. power source AC and turned on/off according to the operation of first relay 51. The other end of the switch SW1 is connected to one end of the compressor 41 and second switch SW2. The second switch SW2 has a contact point a for connecting the blow fan 22 to the first switch SW1 and another contact point b for connecting the blow fan 32 to the first switch SW1. The first and second blow fans 22 and 23 are coupled in parallel to one another through the second switch SW2. The switches SW1 and SW2 are controlled by the first and second relays 51 and 52 of the microprocessor 50, respectively. Namely, the first switch SW1 is turned on when the temperature of the freezing compartment 20 measured by the freezing temperature sensor 24 is higher than the set temperature of the freezing compartment 20 or is turned off when the measured temperature is lower than the set temperature. The second switch SW2 is connected to the contact point b so as to turn off the fan 22 and turn on the fan 32 when the temperature of the refrigerating compartment 30 measured by the refrigerating temperature sensor 34 is higher than the set temperature of the refrigerating compartment 30 or is connected to the contact point a so as to turn on the fan 22 and turn off the fan 32 when the measured temperature is lower than the set temperature. This operating control circuit shown in FIG. 3 is operated by a control method which cools the refrigerating compartment 30 first. Therefore it is necessary to have the evaporator 31 matched with the capacity and cooling velocity of the refrigerating compartment 30. Accordingly, the refrigerating compartment 30 is rapidly cooled first and then the freezing compartment 20 is cooled.

Figure 4:
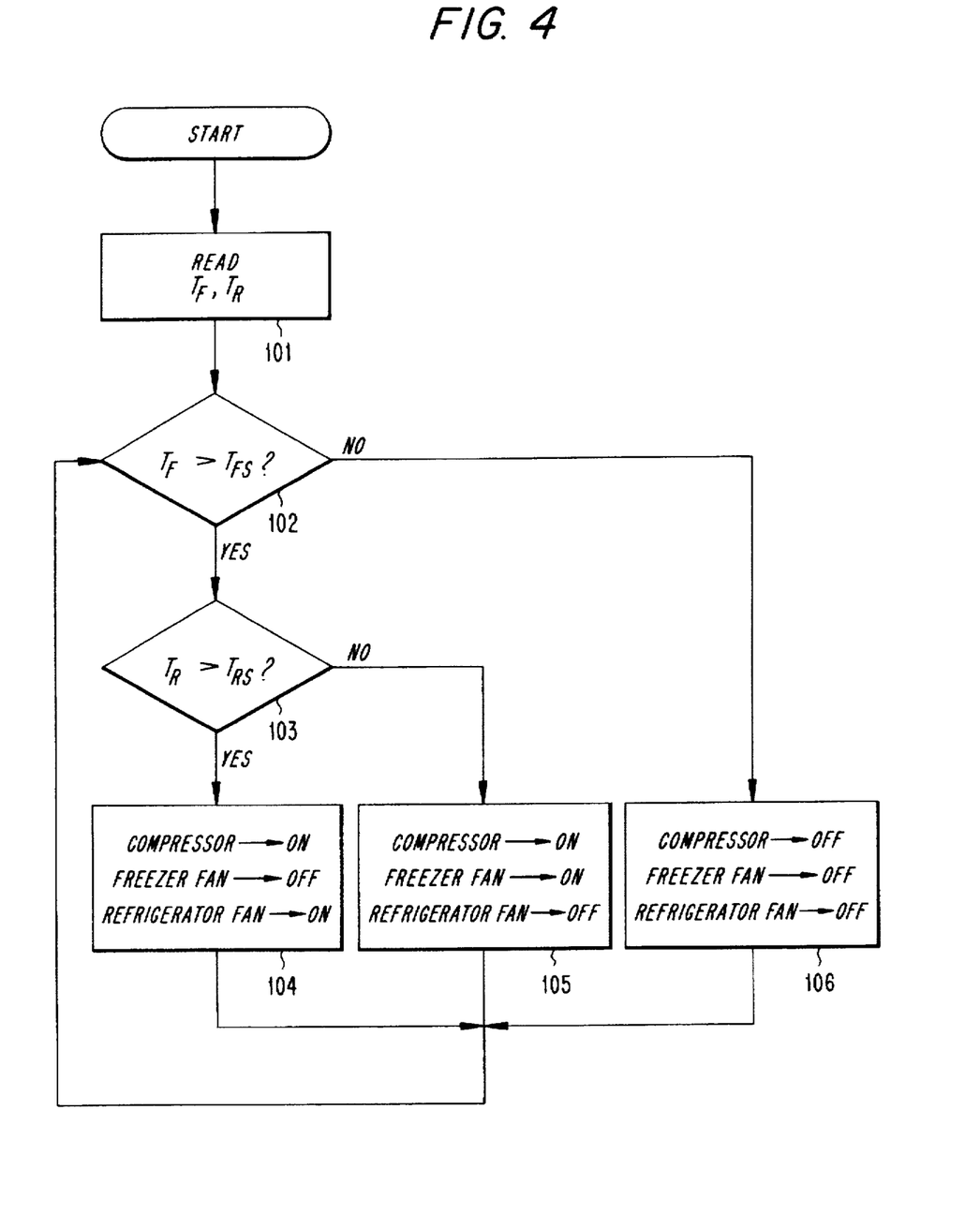
FIG. 4 is a flow chart illustrating the operation of the operating control circuit according to FIG. 3.

According to one embodiment of the invention, as shown in FIG. 4, the microprocessor 50 controls the operating control circuit by a reference value corresponding to the temperature of the freezing compartment as follows:

The microprocessor 50 reads the temperature data $T_F$ and $T_R$ of the freezing and refrigerating compartments 20 and 30 every predetermined time period from the freezing and refrigerating temperature sensors 24 and 34 at step 101. In other words, the temperatures $T_F$ and $T_R$ of the freezing and refrigerating compartments 20 and 30 are detected by the temperature sensors 24 and 34 and then inputted to the microprocessor 50 to be checked. Step 101 goes on step 102 to compare the detected freezing temperature $T_F$ with the first set temperature $T_{FS}$ set by the temperature adjuster 23. At step 103, if the detected freezing temperature $T_F$ is greater than the first set temperature, the detected refrigerating temperature $T_R$ is compared with the second set temperature $T_{RS}$ set by the temperature adjuster 33. If the detected refrigerating temperature $T_R$ is over the second set temperature $T_{RS}$, control proceeds onto step 104 to operate the second relay 52 for turning on the compressor 41 and the fan 32 and turning off the fan 22. To the contrary, if the detected refrigerating temperature $T_R$ is lower than the second set temperature $T_{RS}$, control proceeds onto step 105 to operate the second relay 52 for turning on the compressor 41 and the fan 22 and turning off the fan 32. It will thus be appreciated that during operation of the refrigerator, either (but not both) of the fans 22 and 32 is selectively operated. During the operation of the compressor 41 and the fans 22 and 32, if the detected freezing temperature $T_F$ is below the first set temperature $T_{FS}$ at step 102, control proceeds onto step 106 to stop the first relay 51 for turning off the first switch SW1. Then, the compressor 41 and the fans 22 and 32 are simultaneously stopped.

Figure 5:
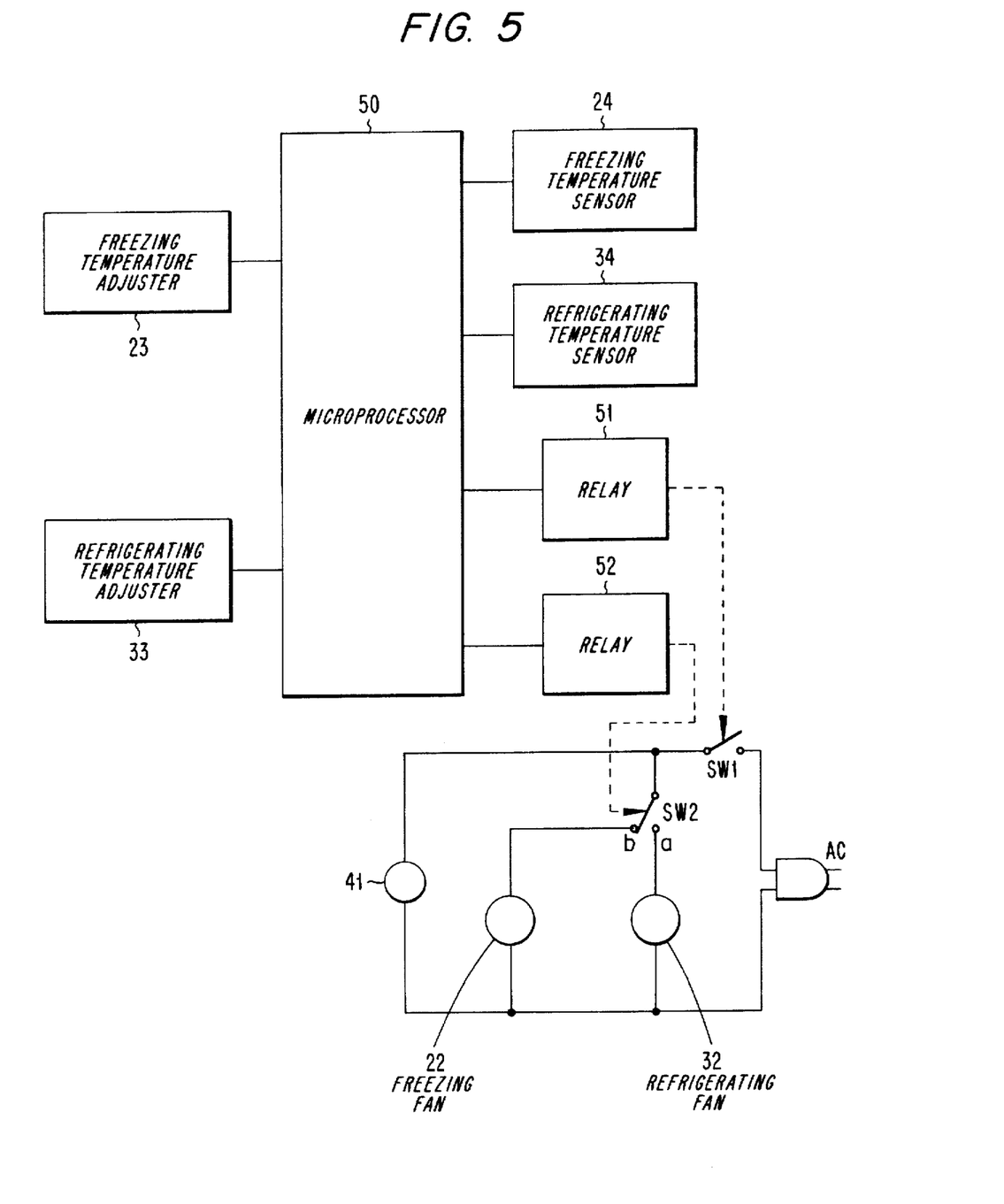
FIG. 5 is an operating control circuit illustrating another embodiment of the invention; and, FIG. 6 is a flow chart illustrating the operation of the operating control circuit according to FIG. 5.
Figure 6:
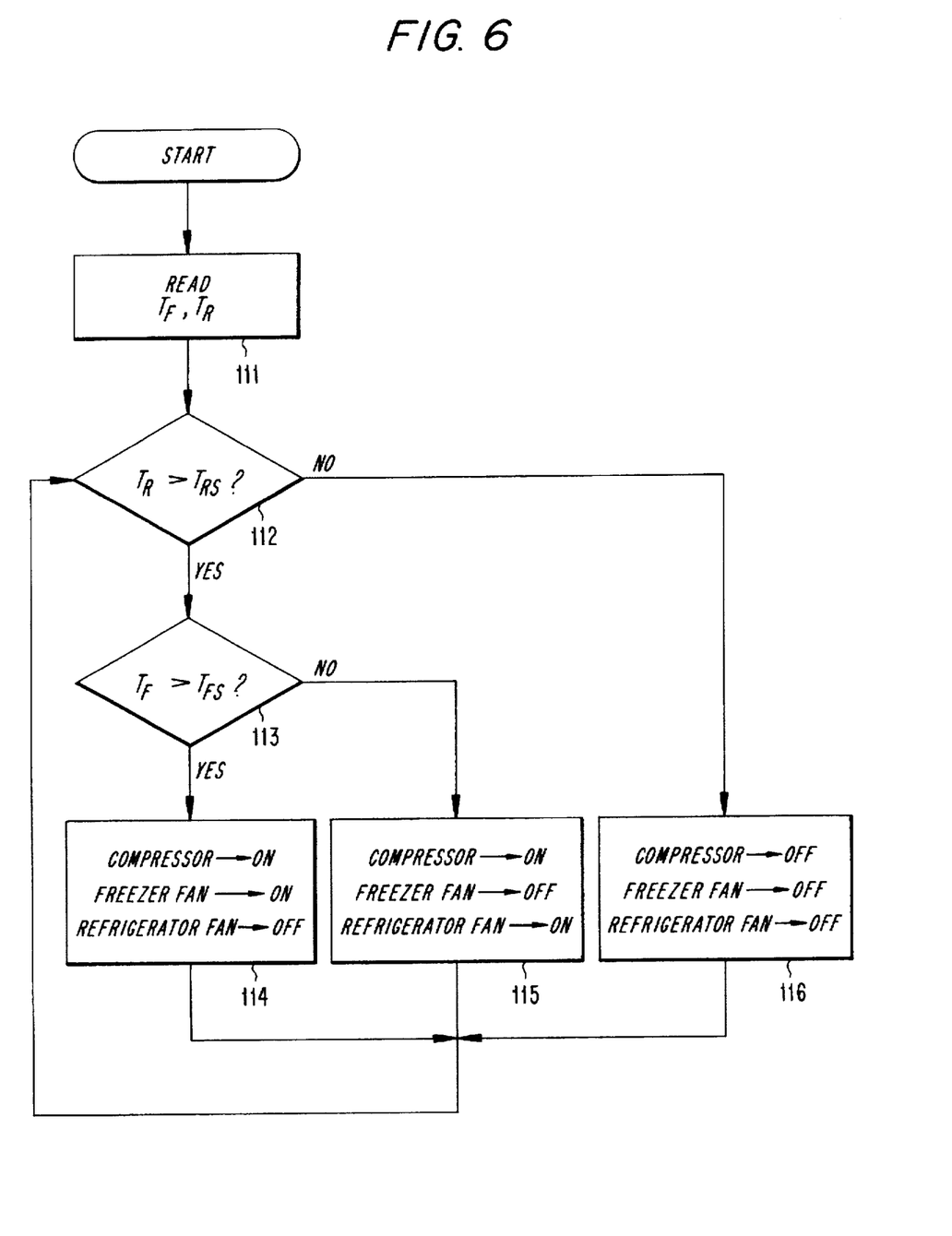

According to a second embodiment of the invention, as shown in FIGS. 5 and 6, an operating circuit controls a system by a reference value corresponding to the temperature of a refrigerating compartment as follows:

The operating control circuit is the same as shown in FIG. 3, except that the positions of the fans 32, 22 are reversed.

This operating control circuit shown in FIG. 5 is operated by a control method which cools the freezing compartment 20 first, in contrast to the circuit of FIG. 3 which cools the refrigerating compartment first. Therefore it is necessary to have the evaporator 21 matched to the capacity and cooling velocity of the freezing compartment 20. Accordingly, the freezing compartment 20 is rapidly cooled first and then the refrigerating compartment 30 is cooled.

First switch SW1 is connected at one end to an A.C. power source AC and turned on/off according to the operating of first relay 51. The other end of the switch SW1 is connected to each one of the ends of the compressor 41 and second switch SW2. The second switch SW2 has a contact point a for connecting the fan 32 to the first switch SW1 and the other contact point b for connecting the fan 22 to the first switch SW1. The fans 22 and 23 are coupled in parallel to one another through the second switch SW2. The first and second switches SW1 and SW2 are controlled by the first and second relays 51 and 52 of the microprocessor 50, respectively. Namely, the first switch SW1 is turned on when the temperature of the refrigerating compartment 30 detected by the refrigerating temperature sensor 34 is greater than the set temperature of the refrigerating compartment 30 or is turned off when the detected temperature is smaller than the set temperature. The second switch SW2 is connected to the contact point b so as to turn on the fan 22 and turn off the fan 32 when the temperature of the freezing compartment 20 detected by the freezing temperature sensor 24 is greater than the set temperature of the freezing compartment 20 or is connected to the contact point a so as to turn off the fan 22 and turn on the fan 32 when the detected temperature is smaller than the set temperature.

According to the second embodiment of the invention, as shown in FIG. 6, a microprocessor 50 controls an operating control circuit by the reference of the temperature of a refrigerating compartment as follows:

The microprocessor 50 reads the temperature data $T_F$ and $T_R$ of the freezing and refrigerating compartments 20 and 30 every predetermined time period from the freezing and refrigerating temperature sensors 24 and 34 at step 111. In other words, the temperatures $T_F$ and $T_R$ of the freezing and refrigerating compartments 20 and 30 are detected by the temperature sensors 24 and 34 and then inputted to the microprocessor 50 to be checked. Step 111 goes onto step 112 to compare the detected refrigerating temperature $T_R$ with the second set temperature $T_{RS}$ set by the temperature adjuster 33. At step 113, if the detected refrigerating temperature $T_R$ is greater than the second set temperature, the detected freezing temperature $T_F$ is compared with the first set temperature $T_{FS}$ set by the temperature adjuster 23. If the detected freezing temperature $T_F$ is above the first set temperature $T_{FS}$, control proceeds onto step 114 to operate the second relay 52 for turning on the compressor 41 and the fan 22 and turning off the fan 32. To the contrary, if the detected freezing temperature T is below the set temperature $T_{FS}$, control proceeds onto step 115 to operate the second relay 52 for turning on the compressor 41 and the fan 32 and turning off the fan 22. Then, either of the fans 22 and 32 is selectively operated. During the operation of the compressor 41 and the fans 22 and 32, if the detected refrigerating temperature $T_R$ is below the second set temperature $T_{RS}$ at step 112, control proceeds onto step 116 to stop the first relay 51 for turning off the first switch SW1. Then, the compressor 41 and the fans 22 and 32 are simultaneously stopped.

As described above, the invention can operate either of the fans 22 and 32, selectively, thereby reducing power consumption incurred by excessive operation. Additionally, the invention minimizes the refrigerant usage amount and reduces energy consumption by the efficient operating control which turns on/off the compressor according to the temperatures of the freezing and refrigerating compartments and selectively operates either the blow fan 22 disposed in the freezing compartment or the blow fan 32 disposed in the refrigerating compartment according to the freezing and refrigerating temperatures detected by the sensors. Also, the invention can cool either of the freezing and refrigerating compartments quickly thanks to the selective operation and realizes a simple structure thanks to the elimination of air flow passages required in the prior art.

What is claimed is:

1. A refrigerator comprising:

at least first and second cooling compartments, operating at different temperatures, respectively;

a refrigeration circuit including first and second evaporators communicating with the first and second compartments, respectively, and a compressor for compressing refrigerant supplied to the first and second evaporators;

a first temperature sensor for sensing a temperature of the first compartment;

a second temperature sensor for sensing a temperature of the second compartment;

first and second fans for circulating air across the first and second evaporators, respectively, the first and second fans connected in parallel relative to a power source;

first and second switches, the first switch interconnecting the power source with both the compressor and the second switch for supplying power thereto, the second switch interconnecting the first switch alternately with the first and second fans for turning on either of the first and second fans while turning off the other of the first and second fans; and a control mechanism connected to the first and second sensors and the first and second switches for automatically controlling the first and second switches in response to temperatures detected by the first and second sensors.

2. The refrigerator according to claim 1 wherein the first and second compartments are freezing and refrigerating compartments, respectively.

3. The refrigerator according to claim 1 wherein the first and second compartments are refrigerating and freezing compartments, respectively.

4. A method for controlling the operation of a refrigerator having at least first and second cooling compartments operating at different respective temperatures; evaporators communicating with respective ones of the compartments; first and second fans communicating with respective evaporators and connected in parallel to a power source; a compressor connected in parallel to the fans and the power source; first and second switches; the first switch interconnecting the power source with both the compressor and the second switch for supplying power thereto; the second switch interconnecting the first switch alternately with the first and second fans for turning on either of the first and second fans while turning off the other of the first and second fans; the method comprising the steps of:

A) sensing, periodically, the temperatures of the first and second compartments;

B) comparing the sensed temperature of the first compartment with a first reference temperature;

C) activating the first switch to block the supply of electrical power to the compressor and second switch to prevent activation of the compressor and first and second fans when the sensed temperature of the first compartment is lower than the first reference temperature;

D) comparing the sensed temperature of the second compartment with the second reference temperature when the sensed temperature of the first compartment is higher than the first reference temperature in step B;

E) activating the first and second switches to supply power to the compressor and only the second fan when the sensed temperature of the second compartment is higher than the second reference temperature in step D; and F) activating the first and second switches to supply power to the compressor and only the first fan, when the temperature of the second compartment is lower than the second reference temperature in step D.

5. The method according to claim 4 wherein step B comprises sensing, periodically, a temperature of a freezing compartment defining said first compartment, and a temperature of a refrigerating compartment defining said second compartment.

6. The method according to claim 4 wherein step B comprises sensing, periodically, a temperature of a refrigerating compartment defining said first compartment, and a temperature of a freezing compartment defining said second compartment.

* * * * *